(12) United States Patent  
Jansen

(10) Patent No.: US 6,805,406 B1  
(45) Date of Patent: Oct. 19, 2004

(54) SEAT FOR A WHEELED CARRIAGE OR CHAIR

(75) Inventor: Klaus Jansen, Buxtehude (DE)

(73) Assignee: Thomas Hilfen HILBEG GmbH & Co. Kommanditgesellschaft, Bremervorde (DE)

( * ) Notice: Subject to any disclaimer, the term of this patent is extended or adjusted under 35 U.S.C. 154(b) by 0 days.

(21) Appl. No.: 09/570,480

(22) Filed: May 12, 2000

(51) Int. Cl.[7] .................................................. A47C 1/02
(52) U.S. Cl. ...................... 297/328; 297/341; 297/342; 297/317; 280/304.1
(58) Field of Search ................................ 297/342, 317, 297/318, 354.12, 354.13, 328, 253, 256.1, 256.16, 344.18, 344.25, 378.1, 378.14, 344.1, 341, 340, 324, 316, 423.19; 280/304.1, 648, 30, 47.38

(56) References Cited

U.S. PATENT DOCUMENTS

| | | | | |
|---|---|---|---|---|
| 3,404,917 A | * | 10/1968 | Smith ....................... | 297/256.1 |
| 4,015,877 A | * | 4/1977 | Button ........................ | 297/341 |
| 4,152,024 A | * | 5/1979 | Farelli ........................ | 297/341 |
| 4,269,446 A | * | 5/1981 | Gersmann et al. .......... | 297/341 |
| 4,796,952 A | * | 1/1989 | Piretti ........................ | 297/340 |
| 5,447,359 A | * | 9/1995 | Asbjornsen et al. .... | 297/423.35 |
| 5,531,503 A | * | 7/1996 | Hughes ............... | 297/378.1 X |
| 5,567,008 A | * | 10/1996 | Cone, II ................ | 297/256.16 |
| 5,941,602 A | * | 8/1999 | Sturt et al. ................. | 297/340 |
| 6,010,190 A | * | 1/2000 | Downey ..................... | 297/340 |
| 6,048,030 A | * | 4/2000 | Kanda et al. ................ | 297/341 |

FOREIGN PATENT DOCUMENTS

| | | | |
|---|---|---|---|
| DE | 35 27 264 | 2/1986 | |
| DE | 39 39 657 | 6/1991 | |
| DE | 296 18 740 | 4/1997 | |
| DK | DE 4137599 | * 5/1993 | ............ 297/256.16 |
| EP | 0 347 361 | 12/1989 | |
| FR | 2 553 985 A | 5/1985 | |

* cited by examiner

Primary Examiner—Peter M. Cuomo  
Assistant Examiner—Stephen Vu  
(74) Attorney, Agent, or Firm—Technoprop Colton LLC

(57) ABSTRACT

A seat (10) for a wheeled carriage or chair for children or disabled people, the seat having a multipart seat surface (11) and a pivotable backrest (12) connected to at least one part of the seat surface (11), such that with the pivoting of backrest (12) the position of at least one part of the seat surface is changed.

17 Claims, 7 Drawing Sheets

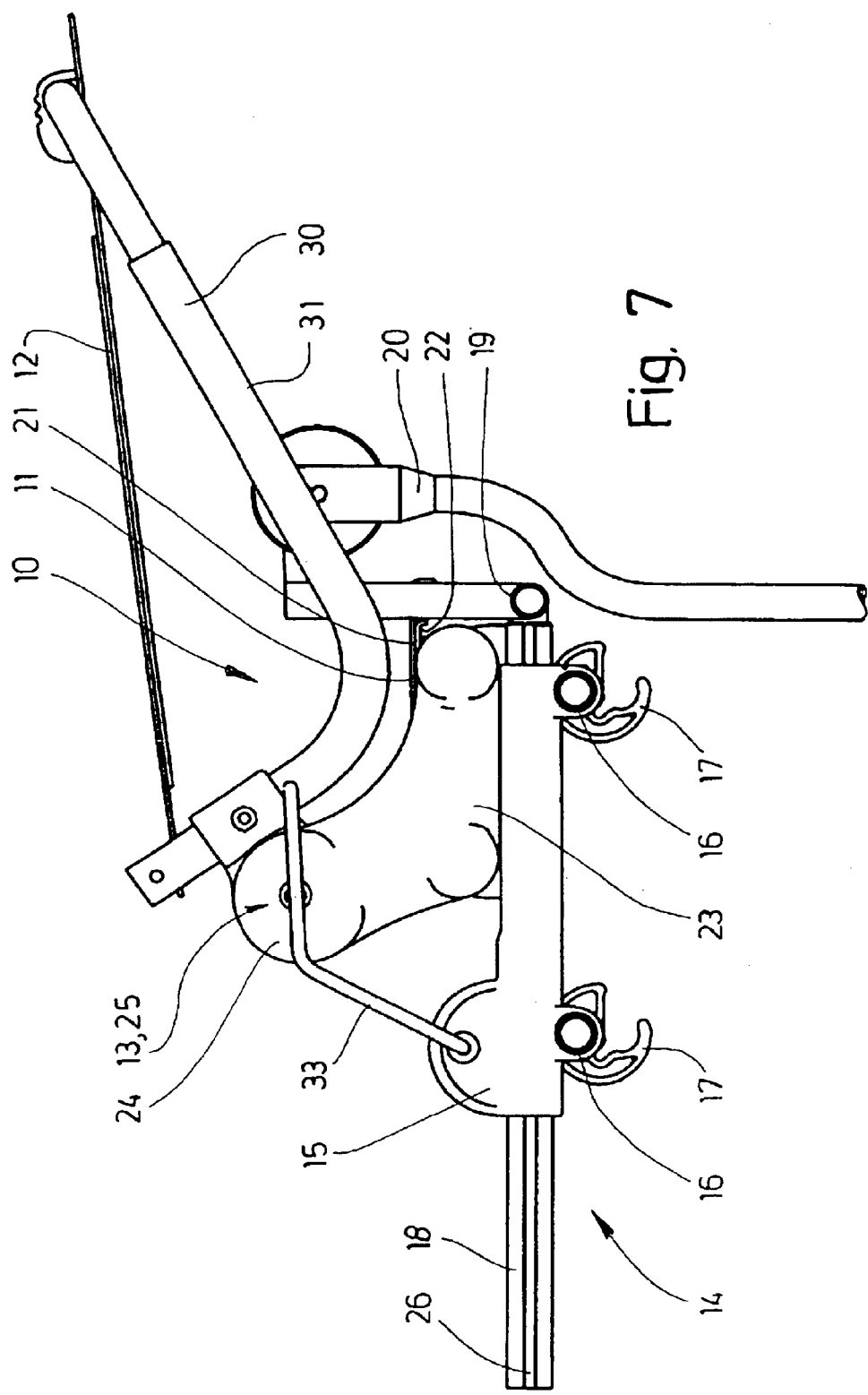

SEAT FOR A WHEELED CARRIAGE OR CHAIR

BACKGROUND OF THE INVENTION

1. Technical Field

The invention relates to a seat particularly for a wheeled carriage, chair or the like The seat referred to here can be used in wheeled carriages, i.e. baby carriages, in particular pushchairs, and also wheelchairs for disabled people, in particular disabled children or young people, or can be used in chairs. The seat can preferably be folded up so that it can be stored in a space-saving manner when not in use (for example, in a car).

2. Prior Art

Known seats of the type mentioned at the beginning have a pivotable backrest. The backrest can be pivoted from an upright or virtually upright position, in which the children or disabled people adopt an upright sitting position, into a completely or virtually horizontal position, in which the children or young children can recline. Particularly whenever the seat accommodates severely disabled young people, the weight of the said young people leads to a noticeable shift in the center of gravity of the person in the seat with respect to the underframe of a wheeled carriage, a chair or the like when the backrest is adjusted from a reclining position into the sitting position. This shift in the center of gravity results in the risk of the wheeled carriage, chair, or the like tipping over.

BRIEF SUMMARY OF THE INVENTION

Starting from the above, the invention is based on the object of providing a seat particularly for children and/or disabled people, in which the risk of tipping over of the wheeled carriage or chair provided with the seat is eliminated.

A seat for achieving this object has the features claimed herein. By virtue of the fact that when the backrest of the seat is pivoted, the position of the seat surface is changed, a shifting in the center of gravity of the person in the wheeled carriage, the shifting being caused by the pivoting of the backrest, can be compensated for. Accordingly, a shift in the center of gravity, which leads to the wheeled carriage, chair, or the like tipping over, takes place only to an insignificant extent, if at all.

The seat is preferably designed in such a manner that pivoting of the backrest enables the seat surface, and in particular also the backrest, to be displaced along a preferably straight path with respect to an underframe of the wheeled carriage or with respect to a chair frame, such as a supporting frame, for example. By this means, virtually the entire seat is displaced with respect to the supporting frame if, by pivoting of the backrest, the person sitting in the seat is raised from a reclining position or vice versa. The person in question is thereby displaced together with the seat in such a manner that the center of gravity of the person is always located in such a position with respect to the underframe, chair frame or the like that the frames cannot tip over.

According to a preferred embodiment of the invention, the seat, in fact particularly together with the seat surface, is mounted displaceably on preferably two parallel guiding members. The guiding members form guiding paths that preferably run approximately horizontally. However, they can also slope away slightly to the foot end of the person sitting in this seat, as a result of which raising the person by folding the backrest upwards is facilitated.

Provision is furthermore made for connecting the backrest pivotably to the seat surface. This preferably takes place by means of two tilting bearings that are assigned on opposite sides at least to one part of the seat surface, in particular, in a fixed manner. The backrest is coupled pivotably to the tilting bearings; specifically by pivot points, the pivot points of the two spaced-apart tilting bearings lying on a common, imaginary pivot axis which runs in a horizontal direction transversely with respect to the direction of movement of, for example, the wheeled carriage. The pivotable coupling of the backrest to the seat surface makes it possible to displace the entire seat, but preferably only at least one part of the seat surface, with respect to the supporting frame. To this end, the tilting bearings are mounted displaceably in or on the guiding members.

According to an advantageous embodiment of the invention, base parts and guiding paths, the base parts being longitudinally displaceable on the guiding paths form the guiding members. To this end, the base pans are preferably designed as sleeve-like guides that surround the guiding paths. The base parts also have other functions: one for thing, they serve, with the assistance of corresponding coupling means to fasten the seat and the guiding paths to the supporting frame, for example to an underframe of the wheeled carriage. This takes place in accordance with a further inventive concept for which independent protection is claimed, which enables the seat together with the guiding paths and base parts to be separated from the supporting frame. For another thing, the base parts serve to change the distance of a footrest, which is fastened to the guiding paths, with respect to the backrest, in order to adapt the depth of the seat to children or young people differing in size.

The guiding paths can be formed from preferably straight guiding rods. These guiding rods are expediently rigid in all directions. In addition, it is also conceivable to form the guiding paths from chains or profiles which are flexible or elastic in one direction. The rigid properties of the chains or profiles suffice in order to guide the seat, in particular at least one part of the seat surface, displaceably in a defined manner. In another direction, which preferably runs perpendicularly with respect to the direction in which the chains or profiles are rigid, the chains or profiles are elastic or flexible. This enables the guiding paths to be kept comparatively short because that part of the said paths which is not required at a given instant for guiding the seat can be moved out of the actual guiding path.

According to a preferred embodiment of the seat according to the invention, the backrest is connected to at least one base part via a coupling element. It is preferable if at least one coupling element is provided between the backrest and each base part. The particular coupling element is coupled at a distance from the pivot point of the corresponding tilting bearing for connecting the backrests to the seat surface. This has the result that when the backrest is pivoted about the swivel points on the tilting bearings, the coupling elements which are supported on the base parts displace the tilting bearings together with the pivot points, and the position of the seat surface with respect to the underframe or another supporting frame is changed. Because the backrest is coupled to the seat surface, the backrest joins in with the positional change of the seat surface or of part of the said seat surface. However, this movement is combined with the tilting movement of the backrest, as a result of which a relative movement is brought about between the backrest, on the one hand, and the seat surface, on the other hand. This change in the position of the backrest and the seat surface leads to the seat, to be precise essentially only the seat surface or at least part thereof, adopting a changed position, so that the center of gravity of the person sitting or reclining in the seat does not change, or does not change significantly, with respect to the supporting frame in the horizontal direction, and this avoids there being the risk of the wheeled carriage, chair or the like tipping when the backrest is pivoted and the position of the person sitting or reclining in the seat changes as a result.

According to a preferred embodiment of the invention, the or each coupling element is coupled to the backrest and to the relevant bass part in such a manner that when the seat is folded up, i.e. the backrest is pivoted onto the seat surface, the particular coupling element perpendicularly intersects with the (imaginary) rotational axis running through the swivel points of the tilting bearings. This has the effect that when the backrest is initially folded onto the seat surface, the seat is moved in the one direction, and when the backrest is completely folded onto the seat surface, the said seat is moved back in the opposite direction. The result is that the folded-up seat takes up particularly little space.

BRIEF DESCRIPTION OF THE FIGURES

A preferred exemplary embodiment of the seat according to the invention is explained in greater detail below with reference to the drawing.

FIG. 7 shows the seat in a folded-up state in a view according to FIGS. 4 to 6.

DETAILED DESCRIPTION OF EMBODIMENTS

Figure 1:
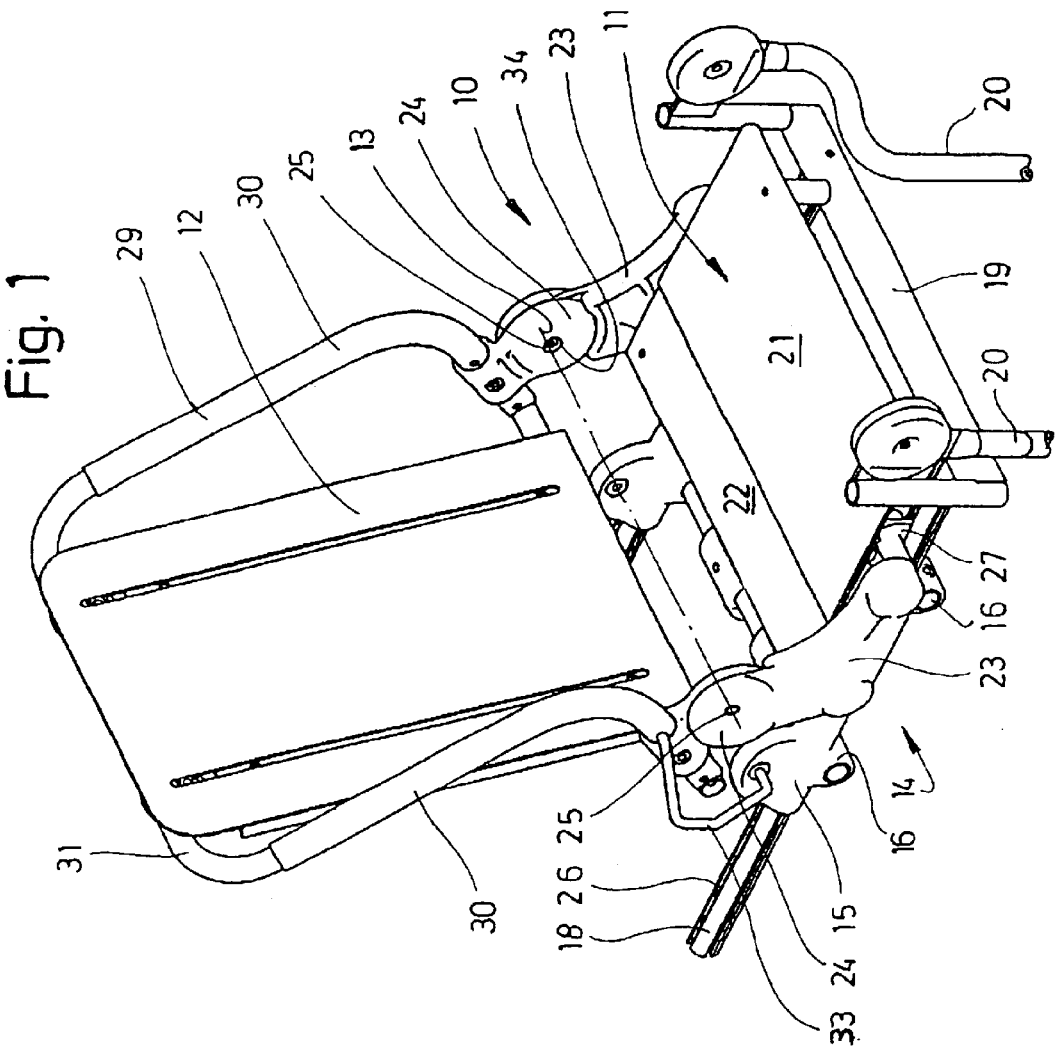
FIG. 1 shows a perspective view of the seat obliquely from the front.
Figure 2:
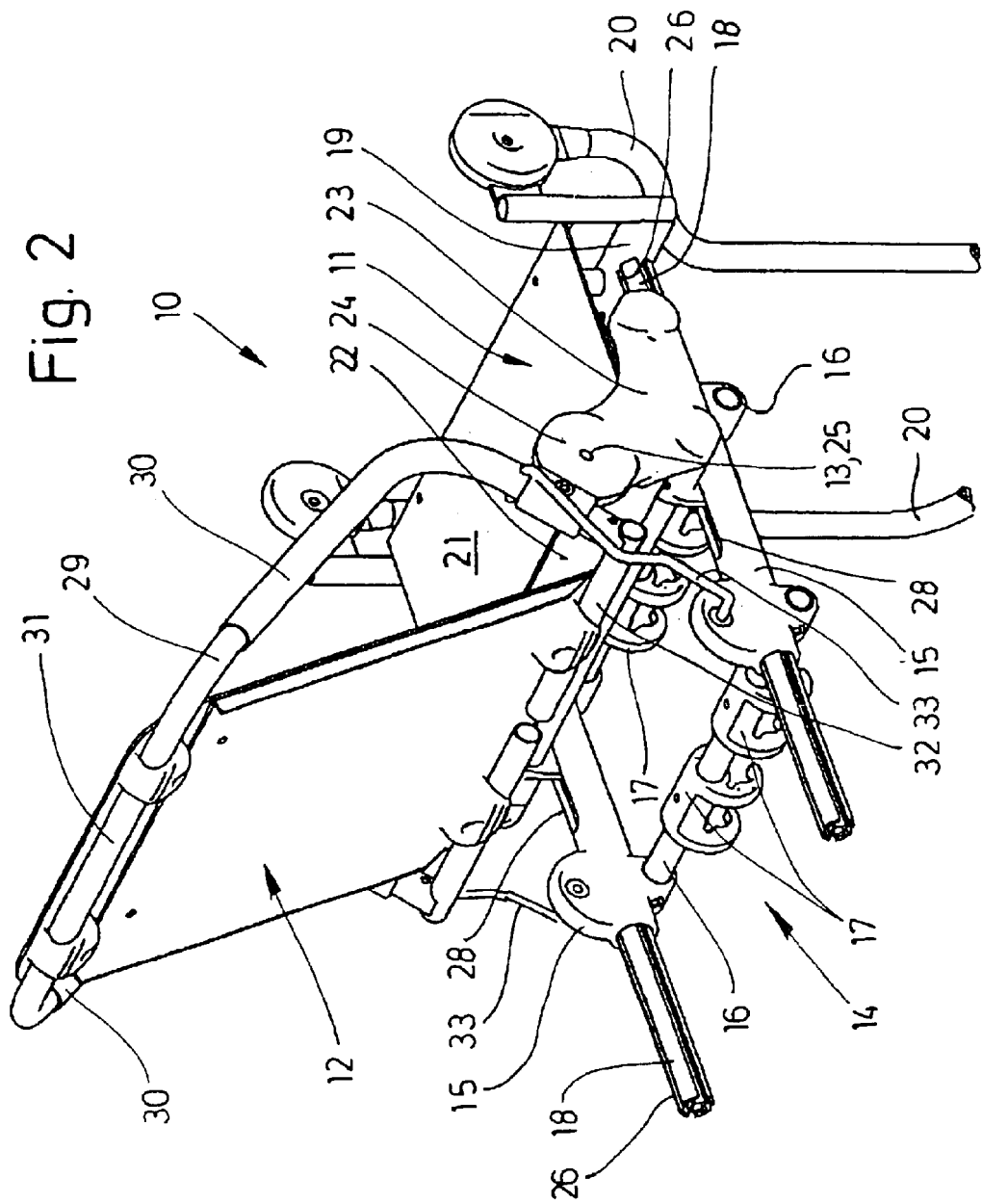
FIG. 2 shows a perspective view of the seat of FIG. 1 obliquely from the rear.

The seat 10 of the invention shown in the figures may be a seat for a wheeled carriage, in particular a baby carriage, a pushchair or a wheelchair for disabled children or young people, or for a chair, for example a children's highchair, or the like. The seat 10 is fastened releaseably on an underframe 35, part of which is shown only in FIG. 4, of a baby carriage, for example.

The seat 10 has an approximately horizontal, multi-part seat surface 11 and a backrest 12. The backrest 12 is connected to the seat surface 11 in a manner such that it can pivot about a horizontal pivot axis 13. The backrest 12 can be pivoted with respect to the seat surface 11 to such an extent that is passes from a slightly oblique sitting position (FIG. 4) into an approximately horizontal reclining position (FIG. 6), in which the seat surface 11 and the backrest 12 approximately form a continuous reclining surface, as well as into a transporting position (FIG. 7) where it is folded against the seat surface 11.

The seat 10 additionally has a substructure 14. This substructure 14 has base parts 15 which are arranged on opposite longitudinal sides of the seat 10 and are of sleeve-like design. The base parts 15 are arranged running parallel to each other at a slight distance below the seat surface 11 and like the seat surface 11, run approximately horizontally. The two parallel base parts 15 on opposite sides of the seat surface 11 are connected both in their front and in their rear and regions by transverse struts 16. The transverse struts 16 are fastened to opposite ends of the base parts 15 and run spaced apart and parallel to each other.

Each transverse strut 16 is assigned two latching claws 17 which serve for the releasable, namely latching connection of the seat 10 to a supporting frame. The supporting frame can be an underframe 35 illustrated in an outlined manner in FIG. 6, namely by an upper section. The seat 10 can be coupled by this means to the upper part of the underframe 35. The seat 10 can likewise be uncoupled from the underframe 35 in order to use it elsewhere, for example to couple it to a chair frame, for which purpose the latching claws 17 are again used. This releasable connection of the seat 10 to different supporting frames relates to an independent inventive concept. In this connection, it also concerns an advantageous development of the seat 10.

The latching claws 17 are connected below the base parts 15 to the base parts via the transverse struts 16. The latching claws 17 are mounted eccentrically on the transverse struts 16. Each of the identically designed latching claws 17 is provided with a slightly oblong latching mouth 36 which is open on one side. The latching mouths 36 are designed in such a manner that they can be pushed from the open side in a latching manner onto transverse struts of the underframe 35 or of another supporting frame, which transverse struts run parallel below the transverse struts 16 of the substructure 14 of the seat 10.

Instead of the described latching claws 17, other coupling members can also be used for the releasable connection of the seat 10 to a supporting frame, in particular an underframe 35.

Each of the identically designed, sleeve-like base parts 15 is assigned a guiding rod 18. The base parts 15 are assigned a guiding rod 18. The base parts 15 form-guiding members of the guiding rods 18. The guiding rods 18, which run in opposite, longitudinally directed edge regions below the seat 10, are mounted displaceably in the sleeve-like base parts 15.

Those ends of the two guiding rods 18, which are situated at the front, in the viewing direction of the person in the seat 10 (seat longitudinal direction), namely, are assigned to the front side of the seat 10, are connected to each other by a cross piece 19. This cross piece 19, which therefore runs perpendicularly with respect to the longitudinal axis of the guiding rods 18, serves to fasten a pivotable footrest 20 to the substructure 14. In addition, in the exemplary embodiment shown, a front part 21 of the seat surface 11, which is of two-part design, is fastened to the cross piece 19.

A second part of the seat surface 11, namely a rear part 22, is connected at opposite sides to a respective tilting bearing 23. The backrest 12 is connected pivotably to the seat surface 11 via the tilting bearings 23, which are of identical design. To this end, each tilting bearing 23 forms a swivel joint 24 between the backrest 12 and the seat surface 11 or the rear part 22 of the seat surface 11. Each swivel joint 24 has a swivel point 25; the swivel points 25 of the two swivel joints 24 of the tilting bearings 23 lying on opposite sides of the horizontal pivot axis 13 which runs transversely with respect to the guiding rods 18.

Figure 3:
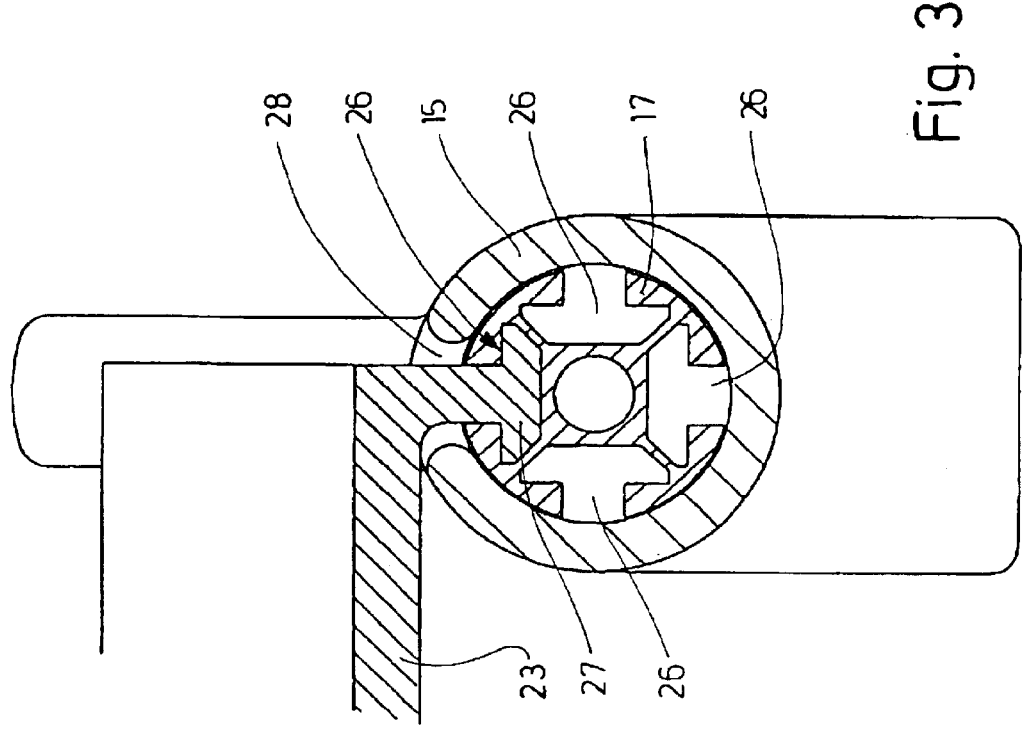
FIG. 3 shows an (enlarged) section III—III through a guiding rod of the seat of FIGS. 1 and 2.

The two tilting bearings 23 can be displaced longitudinally both with respect to the base parts 15 and also with respect to the guiding rods 18, and specifically in the direction of travel and counter to the direction of travel of, for example, a wheeled carriage bearing the seat 10. In the process, the tilting bearing 23 am guided in corresponding guides of the guiding rods 18. In the case of the guiding rods 18 shown here, the guides are formed by T-shaped grooves 26 running in the longitudinal direction of the guiding rods 18. In the exemplary embodiment show (FIG. 3), each guiding rod 18 has four identical grooves 26 distributed uniformly around the circumference. The corresponding tilting bearing 23 can be displaced in only one groove 26 of each guiding rod 18, by means of a correspondingly designed guiding web 27 on the tilting bearing 23. The remaining grooves 26 in the guiding rods 18 are unoccupied. It is therefore sufficient if each guiding rod 18 only has a single groove 26. The guiding rods 18 can also have any desired cross sections, so that the invention is not restricted to the design shown (FIG. 3) of the guiding rods 18.

The tilting bearings 23 can be displaced along the guiding rods 18 by the guiding webs 27 of the tilting bearings 23 being guided in a longitudinally displaceable manner in the grooves 26 running in the longitudinal direction of the guiding rods 18. Because the tilting bearings 23 are connected to the rear part 22 of the seat surface 11, when the tilting bearings 23 are displaced, that part of the seat surface 11 which is formed by the rear part 22, is pushed to or fro in the longitudinal direction of the seat 10. As this happens, the backrest 12, which is connected to the tilting bearings 23 in a manner such that it can pivot about the pivot axis 13, is carried along.

Each base part 15 is provided with a longitudinal slot 28. The guiding webs 27 are guided below the tilting bearings 23 through the longitudinal slots 28. The longitudinal slots 28 are dimensioned in such a manner that the tilting bearings 23 can move longitudinally with respect to the base parts 15. This ensures that when the backrest 12 of the seat 10 is tilted, the tilting beans 23 can be displaced with respect to the base parts 15 in an unobstructed manner.

The two parts of the seat surface 11 are connected releasably to each other by locking members, which are not shown in the figures. If the connection of the front part 21 to the rear part 22 is released, the footrest 20, together with the front part 21, can be pulled forward or pushed back with respect to the remainder of the seat 10. In the process, the guiding rods 18 are carried along and are therefore displaced in the sleeve-like base parts 15. Because the tilting bearings 23, together with the rear part 22, fastened between them, of the seat surface 11, are slid along the guiding rods 18, when the footrest 20 is adjusted, the position of the tilting bearings 23 with respect to the base parts 15 does not change. The footrest 20, but not the front part 21 of the seat surface 11, which front part is fastened to the cross piece 19, can therefore be adjusted relative to the seat 10.

It is alternatively conceivable to mount the tilting bearings 23 in a longitudinally displaceable manner on the base parts 15. A sliding connection and guiding of the tilting bearings 23 along the guiding rods 18 can thereby be omitted.

The backrest 12 can be locked to the tilting bearings 23 by locking screws 34. Be tightening the locking screws 34, which extend through the swivel points 25 of the tilting bearings 23, the backrest 12 is secured in its particular position, i.e. can no longer be tilted.

The backrest 12 is surrounded by a frame 29 which has two bent, tubular side parts 30. On their opposite end regions, the side parts 30 have moulded-on or separate cross tubes 31 and 32. The backrest surface of the seat 10 is fastened to the horizontal cross tubes 31 and 32, which run spaced apart and parallel transversely with respect to the longitudinal direction of the seat 10.

The backrest 12 is connected via the side parts 30 of the frame 29 via the swivel points 25, on the one hand, to the tilting bearings 23 on opposite side parts of the seat surface 11, and, on the other hand, via two coupling elements, which are designed in the exemplary embodiment shown as coupling rods 33, to the base parts 15. Each of the identically designed coupling rods 33 is connected rotatably, at one end at a distance from the particular swivel point 25, to the side part 30 of the frame 29. The other end of each coupling rod 33 is likewise connected rotatably to a respective base part 15.

By means of the coupling rods 33, the distance of the coupling points of the said rods on the frame 29 of the backrest 12 with respect to the coupling points on the base parts 15 is kept constant when the backrest 12 is pivoted. Because of the distance of the swivel points 25 from the coupling points of the coupling rods 33 on the frame 29, this has the result that when the backrest 12 is pivoted, the seat 10, the tilting bearings 23 and the guiding rods 18 are displaced with respect to the base parts 15. In this case, the front part 21 and the rear part 22 of the seat surface 11 are preferably locked relative to each other, so that the front part 21 and the rear part 22 are displaced together.

Figure 4:
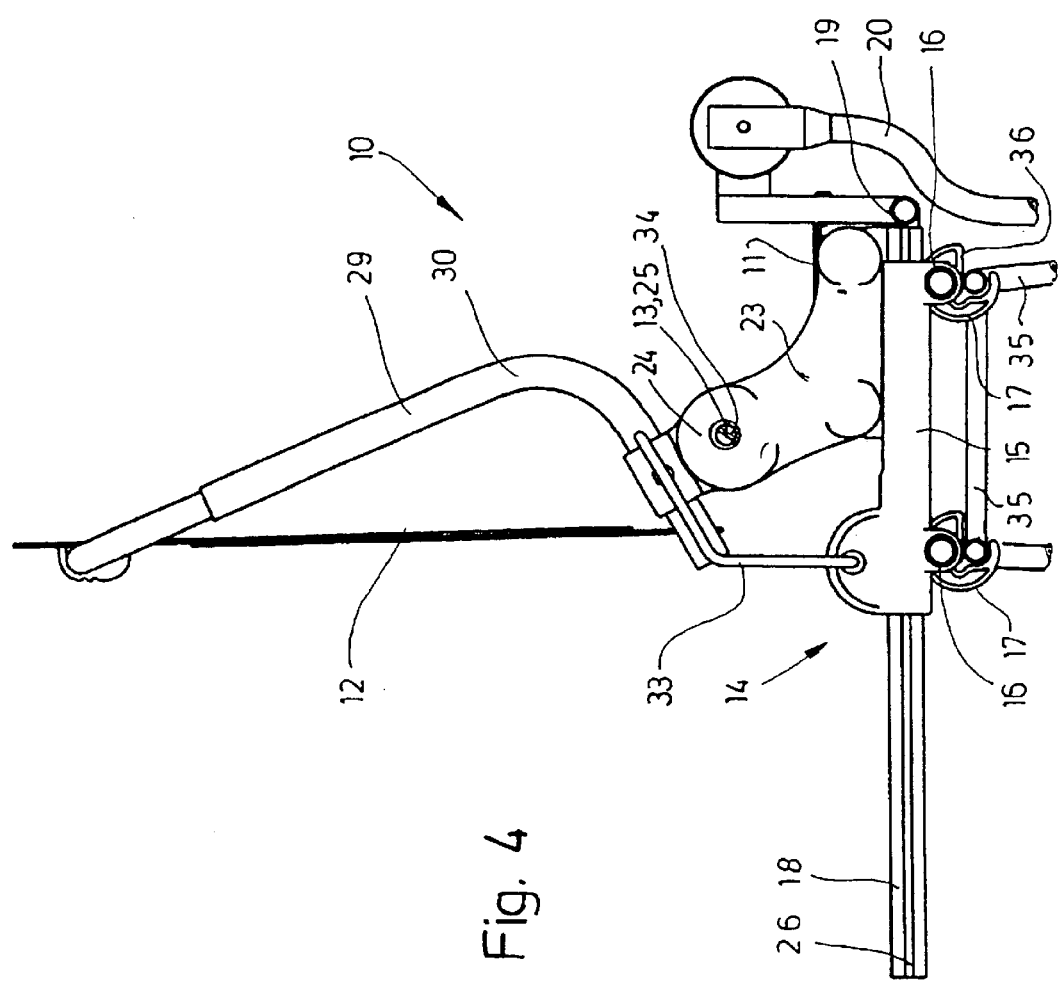
FIG. 4 shows a side view of the seat with a backrest pivoted upwards into a sitting position.

In the following, the adjustment of the seat 10 is explained in greater detail with reference to FIGS. 4 to 7:

FIG. 4 shows the seat 10 with the backrest 12 folded vertically upwards and with the footrest 20 completely retracted. The seat surface 11 is thereby shortened to the greatest possible extent by the front part 21 and the rear part 22 of the seat surface 11 for the most part overlapping.

Figure 5:
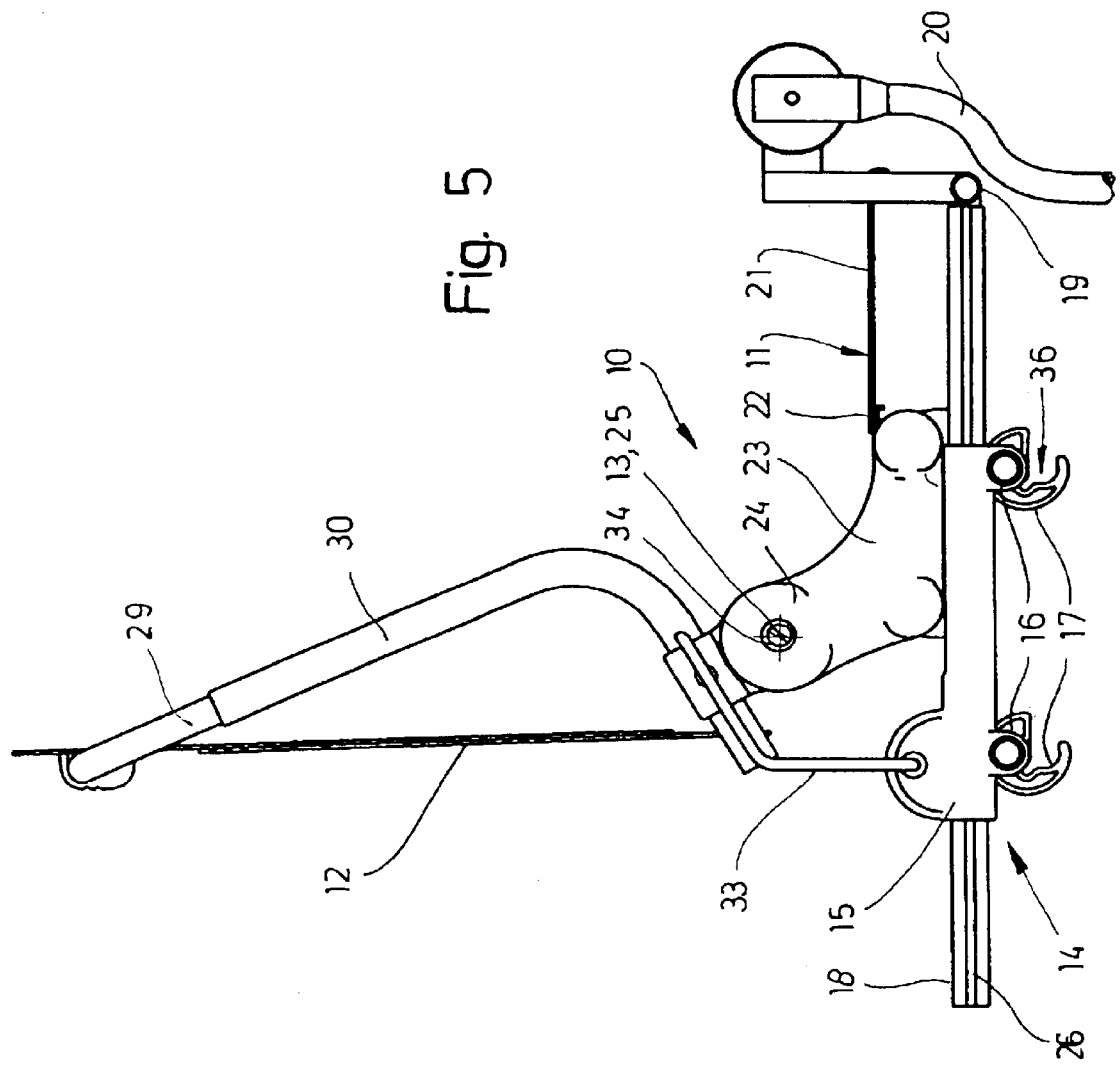
FIG. 5 shows a seat in a view according to FIG. 4 with the footrest adjusted.

FIG. 5 shows the seat 10 with the footrest 20 pulled out to the maximum. The seat surface 11 is then at a maximum size, with there only then being a slight overlap between the front part 21, forming the seat surface 11, and the rear part 22.

The footrest 20, together with the front part 21 assigned to it, of the seat surface 11, is adjusted by the lock between the front part 21 and the rear part 22 being released first of all and by the guiding rods 18, together with the footrest 20, being displaced in the base parts 15 with the backrest 12 locked, i.e. non-tiltable. In this case, the position of the tilting bearings 23 with respect to the base parts 15 remains unchanged (cf. FIGS. 4 and 5), as a result of which the position of the rear part 22 of the seat surface 11 does not change either. That is to say, when the footrest 20 is adjusted, only the guiding rods 18 and the front part 21 of the seat surface 11 are changed in their relative position with respect to the stationary rear part 22, the base parts 15 and the tilting bearings 23. After the position of the footrest 20 of the front part 21 of the seat surface 11 is set the front part 21 is again locked with respect to the rear part 22 of the seat surface 11, as a result of which the tilting bearings 23 are also locked such that they are non-displaceable along the guiding rods 18.

Figure 6:
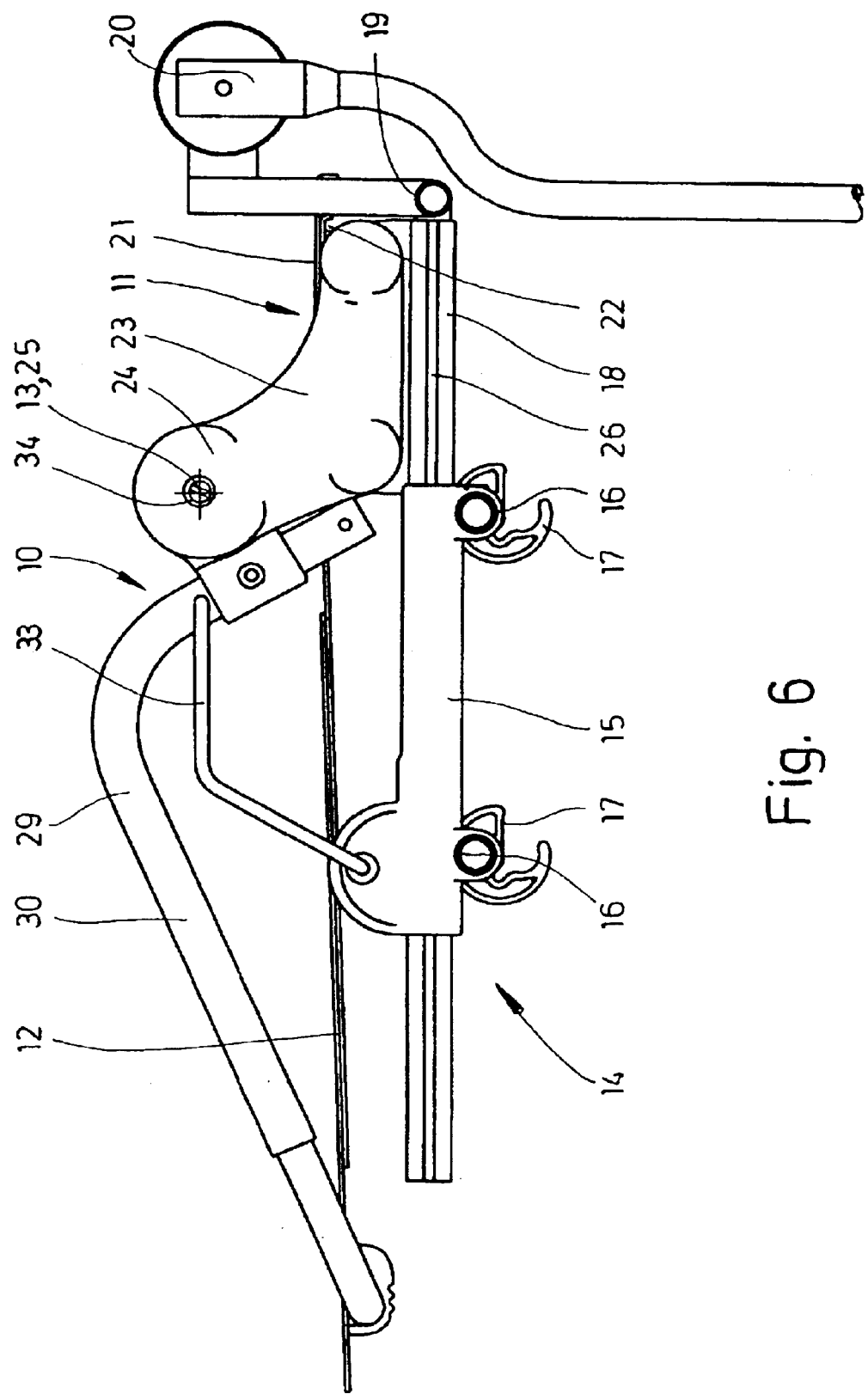
FIG. 6 shows the seat in a reclining position with the backrest folded downwards, in a view analogous to FIG. 4.

FIGS. 5 and 6 show different positions of the backrest 12 with the footrest 20 in the same position with respect to the seat and with the seat surface 11 being of the same size and with the seat depth being the same.

In FIG. 6, the backrest 12 is completely folded back as a result of which the person on the seat 10 passes into a reclining position. In order to fold the backrest 12 back, first of all the locking screws 34 in the regions of the swivel points 25 between the backrest 12 and the tilting bearings 23 on opposite sides of the rear part 22 of the seat surface 11 are released. As a result, the backrest 12 can be pivoted back into the approximately horizontal position shown in FIG. 6. During this pivoting of the backrest 12, because of the coupling rods 33 the distance between the coupling of the said rods to the base parts 15, on the one hand, and the frame 29 of the backrest 12, on the other hand, is kept constant. The result is that because of the connection of the front part 21 to the rear part 22 of the seat surface 11 and because of the fastening of the front part 21 to the guiding rods 18 by means of the cross piece 19, the guiding rods 18 are displaced together with the tilting bearings 23 with respect to the base parts 15, specifically in such a manner that those ends of the guiding rods 18 which bear the footrest 20 are pushed further forwards out of the socket parts 15. Because the backrest 12 is pivoted downwards, the seat surface 11 is pushed forwards in the direction of the footrest 20. This displacement of the seat 10, which is converted into a reclining surface, results in the center of gravity of the person reclining in the seat 10, which center of gravity is pushed back when a reclining position is adopted, being changed in such a manner that the center of gravity of the reclining person in the horizontal direction approximately corresponds to the centre of gravity of the sitting person. The shift in the center of gravity by changing the sitting position into the reclining position is therefore essentially compensated for in the horizontal direction, as a result of which the risk of the wheeled carriage, provided with the seat 10 for example, tipping over when the backrest 12 is pivoted, is neutralized.

FIG. 7 shows the folded-up seat 10 in which the backrest 12 is folded from above against the seat surface 11. Again because of the coupling rods 33 in this case, the distance of their coupling points from the side parts 30 of the frame 29 of the backrest 12, on the one hand, and from the base parts 15, on the other hand, is kept constant. As a result the seat surface 11 together with the tilting bearings 23 and the guiding rods 18 is again displaced with respect to the base parts 15. During the folding of the backrest 12 onto the seat surface 11, this displacement takes place in opposite directions, specifically first of all towards the front in the direction of the footrest 20, and then back. This is achieved by the coupling rods 33 being pivoted away via the swivel joints 24 and in the process intersecting with the (imaginary) pivot axis 13 running through the swivel points 25. In this case, the coupling rods 23 are moved away over a dead center of the pivot axis 13, which results in the said, opposite displacement of the guiding rods 18 together with the seat 10 with respect to the base parts 15, as a result of which the displacement path of the guiding rods 18 with respect to the base parts 15 can be shortened. This results in shorter guiding rods 18 and in an overall compact design of the seat 10, and specifically in particular of its substructure 14.

The above detailed description of the preferred embodiments and the appended figures are for illustrative purposes only and are not intended to limit the scope and spirit of the invention, and its equivalents, as defined by the appended claims. One skilled in the art will recognize that many variations can be made to the invention disclosed in this specification without departing from the scope and spirit of the invention.

What is claimed is:

1. A wheeled carriage for children and disabled people having a seat and an undercarriage comprising a frame said carriage comprising:
   a. a multipart seat surface (11) mounted on at least one guiding means (18) and comprising a displaceable part that is displaceable between positions along the at least one guiding means (18); and
   b. a backrest (12) pivotally connected to the displaceable part of the multipart seat surface (11) by at least one tilting bearing (23) and pivotally connected to at least one base part (15) by at least one coupling element (33), with the at least one coupling element (33) displaceably mounted to the at least one guiding means (18);

wherein pivoting the backrest (12) changes the longitudinal position of the displaceable part of the multipart seat surface along the at least one guiding means (18) by displacement of the at least one tilting bearing (23); the displaceable part of the multipart seat surface is mounted displaceably on the at least one guiding means, and the at least one guiding means is releasably mounted on the frame and the at least one guiding means comprises is coupled releasably to the frame by at least one coupling means, and the at least one coupling means is latching claws (17).

2. The carriage according to claim 1, wherein pivoting the backrest (12) causes the multipart seat surface (11) to be displaced along a path with respect to the frame.

3. The carriage according to claim 2, wherein the path is straight with respect to the frame.

4. The carriage according to claim 1, wherein the at least one tilting bearing (23) is attached to the displaceable part of the multipart seat surface (11), and the backrest (12) is mounted pivotally on the at least one tilting bearing (23).

5. The carriage according to claim 4, wherein the at least one base part is displaceable along the at least one guiding means.

6. The carriage according to claim 5, wherein the displaceable part of the multipart seat surface (11) comprises the at least one tilting bearing (23) and is displaceable with respect to the at least one guiding means.

7. The carriage according to claim 6, wherein the displaceable part of the multipart seat surface (11) is displaceable with respect to the at least one base part.

8. The carriage according to claim 7, wherein the at least one tilting bearing (23) is displaceable in the longitudinal direction of the at least one guiding means.

9. The carriage according to claim 5, wherein the at least one tilting bearing (23) is displaceable with respect to the at least one base part.

10. The carriage according to claim 5, wherein the at least one coupling element is coupled to the backrest (12) and to the at least one base part whereby when the backrest (12) is pivoted, the at least one tilting bearing (23) and the at least one guiding means are longitudinally displaced together with the backrest (12) and the displaceable part of the multipart seat surface relative to the at least one base part.

11. The carriage according to claim 5, wherein the seat is foldable; and the at least one coupling element is coupled to the backrest (12) and to the at least one base part whereby when the seat (10) is folded, the at least one coupling element intersects with a swivel point (25) between the backrest (12) and a pivotal axis (13) connecting the tilting bearings (23).

12. The carriage according to claim 5, further comprising a footrest (20) connected to the at least one guiding means, wherein the footrest (20) has a changeable distance from the backrest (12) that is changeable by displacing the footrest (20) with respect to the at least one base part.

13. The carriage according to claim 5, wherein the multipart seat surface (11) consists of a front part (21) and a rear part (22), wherein the rear part (22) is connected in a fixed manner to the at least one tilting bearing (23), and the front part (21) is connected in a fixed manner to the at least one guiding means.

14. The carriage according to claim 13, wherein the front part (21) is longitudinally displaceable along the at least one guiding means with respect to the rear part (22).

15. The carriage according to claim 13, wherein the front part (21) and the rear part (22) have a locked position in which the front part (21) and the rear part (22) are not displaceable with respect to each other.

16. The carriage according to claim 5, wherein the at least one guiding means are chains that are flexible in a first direction and rigid in a second direction.

17. The carriage according to claim 5, wherein the displaceable part of the multipart seat surface (11) is mounted displaceably on the at least one guiding means, and the at least one guiding means is releasably mounted on the supporting frame.

* * * * *